United States Patent [19]

Kuribayashi et al.

[11] Patent Number: 5,371,153
[45] Date of Patent: Dec. 6, 1994

[54] POLYAMIDE FIBERS

[75] Inventors: Hideyuki Kuribayashi; Tatsuya Koizumi, both of Chiba, Japan

[73] Assignee: Sumitomo Chemical Company Limited, Osaka, Japan

[21] Appl. No.: 225,927

[22] Filed: Apr. 11, 1994

Related U.S. Application Data

[63] Continuation of Ser. No. 861,963, Jun. 19, 1992, abandoned.

[30] Foreign Application Priority Data

Oct. 23, 1990 [JP] Japan ................. 2-286579
Dec. 20, 1990 [JP] Japan ................. 3-404285

[51] Int. Cl.$^5$ ............... B05D 1/36; B32B 25/00; C08F 283/04
[52] U.S. Cl. ................. 525/423; 427/407.1; 427/412; 428/382; 428/383; 525/178; 525/184; 525/427
[58] Field of Search ........... 525/423, 427, 178, 184; 427/407.1, 412; 428/382, 383

[56] References Cited

FOREIGN PATENT DOCUMENTS 61-166826 7/1986 Japan .
61-167089 7/1986 Japan .
62-141174 6/1987 Japan .
63-165583 7/1988 Japan .

OTHER PUBLICATIONS

Br. Polym. J., 3:58 Mar. 1971, Mather.

Primary Examiner—Morton Foelak
Attorney, Agent, or Firm—Cushman, Darby & Cushman

[57] ABSTRACT

The present process for producing aromatic polyamide fibers for reinforcement of rubbers lies in that, in the first step, the fibers are dipped in an epoxy treating solution containing aromatic glycidylamines having 2 or more epoxy groups in one molecule and aromatic amines at a specific ratio and dried and cured, and thereafter, in the second step, the fibers are dipped in a treating solution for the second step containing resorcin formaldehyde resins and rubber latices and dried and cured. More preferably, specific chlorophenol compounds are added to the treating solution for the second step.

The aromatic polyamide fibers obtained by the process of the present invention provide rubber products excellent in water resistance when they are used for reinforcement of rubbers, and the products have high adhesive strength in initial adhesion and besides, small decrease in adhesive strength even if they are dipped in water for a long time.

14 Claims, No Drawings

POLYAMIDE FIBERS

This is a continuation of application Ser. No. 07/861,963, filed on Jun. 19, 1992, now abandoned.

TECHNICAL FIELD

The present invention relates to a process for producing aromatic polyamide fibers for reinforcement of rubbers. Rubbers reinforced with the aromatic polyamide fibers for reinforcement of rubbers which are obtained by the present invention are utilized in various fields of tires, belts, hoses and the like.

BACKGROUND ART

It is known to use aromatic polyamide fibers as fibers for reinforcement of rubbers.

Aromatic polyamide fibers are featured in that they have high strength and high modulus, are excellent in heat resistance and dimensional stability, and do not rust because of organic fibers. Therefore, they are utilized as fibers for reinforcement of rubbers. However, aromatic polyamide fibers have the defect of insufficient adhesion to rubbers. That is, if adhesion between fibers and rubbers is insufficient when fibers are used for reinforcement of rubbers, the effect as reinforcing materials is not sufficiently exhibited. In this respect, aromatic polyamide fibers are inferior to fibers such as nylon, rayon, and vinylon.

Attempt has been made to enhance adhesion of such aromatic polyamide fibers to rubbers. For example, JP-A-59-94640 discloses a process which comprises treating aromatic polyamide fibers with water-soluble epoxy compounds and then treating the fibers with so-called RFL solution comprising resorcin-formaldehyde resins and rubber latices. Furthermore, JP-A-56-2156 discloses use of RFL solution containing reactive materials such as ethylene urea compound.

However, the conventional processes have problems that relatively high adhesive strength is obtained at an initial stage, Out adhesive strength markedly reduces when a reinforced rubber composition is used in contact with water, namely, a problem of poor water resistance.

Under the circumstances, a principal object of the present invention is to provide a process for producing aromatic polyamide fibers which not only nave high adhesion at the initial stage, but also are little reduction in adhesive strength even after they are dipped in water for a long period, namely, excellent in water resistance.

DISCLOSURE OF INVENTION

The inventors nave accomplished the present invention as a result of intensive research in an attempt to attain the above object. That is, the present invention relates to a process for producing aromatic polyamide fibers, characterized by including the following first and second steps.

The first step: This step comprises dipping aromatic polyamide fibers in epoxy treating solution and then drying and curing them, said epoxy treating solution containing 0.1–30% by weight of an aromatic glycidylamines having two or more epoxy groups in one molecule and 1–100 parts by weight of aromatic amines based on 100 parts by weight of the aromatic glycidylamines.

The second step: This step comprises dipping the aromatic polyamide fibers obtained in the first step in a treating solution for the second step containing resorcin-formaldehyde resins and rubber latices and then drying and curing them.

According to further preferred process of the present invention, the second step is effected with the second treating solution containing resorcin-formaldehyde resins, rubber latices and compounds represented by the following formula (1):

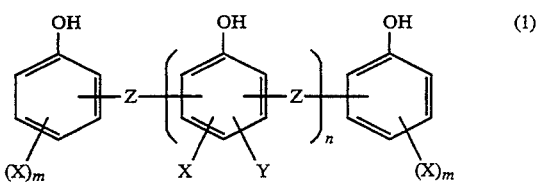

(wherein X each represents a hydrogen atom, a chlorine atom, a bromine atom, an alkyl of 1–8 carbon atoms, an aryl group or an aralkyl group, —OH, —SH, —NH$_2$, —NO$_2$, —COOH, —CH$_2$OH or

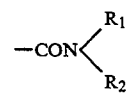

(where R$_1$ and R$_2$ each represents a hydrogen atom or an alkyl of 1–8 carbon atoms, an aryl group or an aralkyl group), Y represents a hydrogen atom, —OH, a chlorine atom or a bromine atom, Z represents

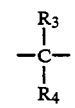

(wherein R$_3$ and R$_4$ each represents a hydrogen atom or an alkyl group of 1–8 carbon atoms), m represents an integer of 0–2 and n represents an integer of 1–10).

The present invention will be explained in detail below.

The aromatic polyamide fibers in the present invention are fibrous materials of poly-p-phenyleneterephthalamide, poly-p- or -m-benzamide or poly-m-phenyleneisophthalamide or those containing 50% by weight or more of these structures. These fibers are, if necessary, previously twisted to some extent until they are formed into cords or woven fabrics and then subjected to the treatments of the first step and the second step of the present invention. In some case, they may be subjected to these treatments after they are made into snort fibers or cotton-like products.

The first step of the present invention comprises dipping aromatic polyamide fibers in an epoxy treating solution and then drying and curing them. The epoxy treating solution contains 0.1–30% by weight by weight of aromatic glycidylamines having two or more epoxy groups in one molecule (herein sometimes referred to as "epoxy compounds") and 1–100 parts by weight, preferably 1–40 parts by weight, of aromatic amines every 100 parts of the aromatic glycidylamines.

Examples of the epoxy compounds used in the present invention are tetraglycidyldiaminodiphenylmethane, triglycidyl-p-aminophenol, triglycidyl-m-aminophenol, triglycidyl-4-amino-m-cresol, diglycidylaniline, diglycidyltoluidine, tetraglycidyl-m-xylylenediamine, and diglycidyltribromoaniline. Tetraglycidyldiaminodiphenylmethane is preferred.

Content of the epoxy compounds in the epoxy treating solution used in the present invention is within the range of 0.1–30% by weight, preferably 0.3–20% by weight, more preferably 0.5–8% by weight, most preferably 1–5% by weight. If the content is less than the lower limit, adhesive strength is insufficient and if it is more than the upper limit, the fibers are inferior in flexibility.

The aromatic amines used in the present invention act as curing agents. Examples of the aromatic amines are 3,4′-diaminodiphenyl ether, 4,4′-diaminodiphenyl sulfone, p,p′-diaminodiphenylmethane, m-phenylenediamine, m-toluylenediamine, o-toluylenediamine, xylylenediamine, 4-chloro-o-phenylenediamine, 3′-diethyl-4,4′-diaminodiphenylmethane, m-aminobenzylamine, diaminopyridine and m-aminophenol. 3,4′-Diaminodiphenyl ether is preferred.

Content of the aromatic amines in the epoxy treating solution is within the range of 1–100 parts by weight, preferably 1.2–40 parts by weight, more preferably 1.5–30 parts by weight every 100 parts by weight of the epoxy compounds. If the content is less than the lower limit, curing of the aromatic glycidylamines in the present invention is slow and apperance of adhesive strength is insufficient. If the content is more than the upper limit, the fibers are inferior in flexibility.

The epoxy treating solution used in the present invention is prepared by dispersing the epoxy compounds and the aromatic amines in water or my dissolving them in organic solvents such as N,N-dimethylformamide, dimethyl sulfoxide, methyl isobutyl ketone, and tetrahydrofuran. In the case of the water dispersion, surface active agents are used for obtaining stable water dispersion. Organic solvents may be used in combination.

The first step of the present invention comprises dipping aromatic polyamide fibers in the epoxy treating solution and drying and curing them.

The drying is conducted by heat treating at about 120°–180° C. for 1–10 minutes, and then the curing is conducted by heat tearing at about 180°–260° C. for 0.5–20 minutes. That is, the two-stem heat treatment, removal of solvents or water is effected at low temperature in the first drying step and then curing epoxy compounds is effected at higher temperature in the second step. A multi-step or continuous system may be conducted, said system being conducted in at least three steps or in such a manner that temperature is continuously raised, as long as there are substantially the drying followed by the curing.

These steps which go through prevent the surface from film-formation or blister (dome-like protuberance)—formation which are readily formed an a curing treatment which is directly effected at high temperature.

Thus, the first step in the present invention is over. The aromatic polyamide fibers subjected to the epoxy treatment are then subjected to the second step.

The second step in the present invention comprises dipping the aromatic polyamide fibers obtained in the first step in a treating solution for the second step containing resorcin-formaldehyde resins and rubber latices, preferably resorcin-formaldehyde resins, rubber latices and compounds represented by the formula (1) and then drying and curing them. Water is usually used as a dispersion medium or a solvent for the treating solution for the second step.

As the resorcin-formaldehyde resins, condensates obtained by allowing resorcin to react with formaldehyde at molar ratios within the range of 0.5/1–3.0/1, in the presence or absence of acid or alkali catalysts are suitably used. Those which are commercially available as resorcin-formaldehyde precondensates may also be used. As the rubber latices, latices of styrene-butadiene rubbers, styrene-butadiene-vinylpyridine rubbers, nitrile rubbers, chloroprene rubbers or the like are used singly or in admixture of two or more, depending on rubber compositions to which the aromatic polyamide fibers are allowed to adhere.

Examples of the compounds represented by the formula (1) are 2,6-bis(2′,4′-dihydroxyphenylmethyl)-4-chlorophenol, 2,6-bis(2′,4′-dihydroxyphenylmethyl)-4-bromophenol, and 2,6-bis(2′,4′-dichlorophenylmethyl)-4-chlorophenol. Among them, 2,6-bis(2′,4′-dihydroxyphenylmethyl)-4-chlorophenol is especially preferred, since it is excellent in affinity for polyamide fibers. As 2,6-bis(2′,4′-dihydroxyphenylmethyl)-4-chlorophenol, commercially available products (for example, "DENABOND" manufactured by Nagase Chemicals Ltd. and "VULCABOND-E" manufactured by Vulnax Co.) may be used as they are. Amount of resorcin-formaldehyde resins against rubber latices is within the range of 10/100–30/100 in terms of solid content ratio.

The compounds represented by the formula (1) are used in an amount within the range of 10–200 parts by weight, preferably 20–150 parts by weight, more preferably 50–100 parts by weight every 100 parts by weight of solids in the resorcin-formaldehyde resins and the rubber latices. If an amount of the compounds is less than the lower limit, improvements in adhesion and water resistance are small, and if it is more than the upper limit, the resulting fibers have not enough flexibility. The latter is often unsuitable for the uses which especially require flexibility.

Concentration of total solid matters in the treating solution for the second step is preferably within the range of 3–25% by weight, more preferably 5–20% by weight.

Process for preparation of the treating solution for the second step is not necessarily critical, but so-called RFL solution comprising resorcin-formaldehyde resins and rubber latices, which has been previously prepared, may be used. The RFL solution may be used alone or preferably in admixture with the compounds represented by the formula (1).

The treatment of aromatic polyamide fibers with the treating solution for the second step is carried out by dipping aromatic polyamide fibers in the treating solution for the second step, and then conducting the same drying and curing as in the first step.

Thus, the aromatic polyamide fibers of the present invention for reinforcement of rubbers are obtained.

As a method of using the aromatic polyamide fibers of the present invention for reinforcement of rubbers, mention may be made of a method of incorporating the aromatic polyamide fibers treated according to the present invention into a rubber compound by heat pressing in accordance with vulcanizing conditions of rubbers.

BEST MODE FOR CARRYING OUT THE INVENTION

The present invention will be explained in the concrete by the following examples, which never limit the present invention.

EXAMPLE 1

Double twist cords (first twist: 330 turn/m (Z), second twist: 330 turn/m (S)) of poly-p-phenyleneterephthalamide fibers ("TWARON" 1000 manufactured by Akzo Co., 1500 d) were continuously dipped in the following epoxy treating solution under a tension of 500 g by a cord dip treating machine and then were dried and cured by passing them in ovens of 150° C. and 240° C. for 2 minutes, respectively. The epoxy treating solution used here comprised 2.0 parts by weight of tetraglycidyldiaminophenylmethane ("SUMIEPOXY" ELM-434 manufactured by Sumitomo Chemical Co., Ltd.) as epoxy compounds, 0.060 part by weight of 3,4'-diaminodiphenyl ether as aromatic amines and 98.0 parts by weight of N,N-dimethylformamide as solvents.

Then, the thus epoxy treated aromatic polyamide fibers were dipped in the following RFL solution and then, dried and cured by passing them in ovens of 150° C. and 240° C. for 2 minutes, respectively. The RFL solution used here comprised 4.6 parts by weight of a precondensate of resorcin-formalin resins ("SUMIKANOL" 700 manufactured by Sumitomo Chemical Co., Ltd., 75 weight % aqueous solution) as resorcin-formalin resins, 50.0 parts by weight of vinylpyridine-styrene-butadiene rubber latex ("PYRATEX" manufactured by Sumitomo Naugatuck Co., Ltd., 41 weight % aqueous solution) as rubber latices, 2.3 parts by weight of formaldehyde (37 weight % aqueous solution), 1.3 parts by weight of 25 weight % ammonia water and 41.8 parts by weight of pure water. Solid weight ratio in resorcin-formalin resin/rubber latex was 16.8/100 and concentration of total solid matters was 25% by weight.

Adhesion test was conducted in the following manner.

The above aromatic polyamide fibers treated with the RFL solution were wound in the form of a single layer by a parallel winder so that they closely contact with each other, but are not wound in layers. A cellophane tape of 24 mm in width was allowed to adhere onto the wound fibers and cut out by a cutter knife to make fabric pieces of the aromatic polyamide fibers of 24 mm in width having the cellophane tape on one side. The following unvulcanized rubber compound pieces (width: 2.4 cm, length: 7.0 cm, thickness: 3 mm) were put between two fabric pieces obtained above so that the aromatic polyamide fibers contacted with the compound pieces. The resulting sandwiches were pressed in a mold at 150° C. for 15 minutes to perform vulcanization adhesion and thus adhesion test pieces were obtained. The unvulcanized compound used here comprised 100 parts by weight of natural rubber, 4 parts by weight of stearic acid, 5 parts by weight of ZnO, 50 parts by weight of HAF black, 3 parts by weight of aromatic process oil ("SONIC" X-100 manufactured by Kyodo Oil Co., Ltd.), 1 part by weight of an aging inhibitor ("ANTIGEN" 3C manufactured by Sumitomo Chemical Co., Ltd. ), 0.5 part by weight of a vulcanization accelerator ("SOXINOL" CZ manufactured by Sumitomo Chemical Co., Ltd.) and 0.2 part by weight of sulfur.

Adhesion was measured in the following manner: strip specimens (2 cm in width) prepared in accordance with JIS K6301 were used and the aromatic polyamide fiber layer was peeled from the adhesion face between the aromatic fiber layer and the rubber compound at 180° and at a pulling rate of 50 mm/min. As a result, adhesive strength was 18.5 kg/2 cm. Furthermore, specimens prepared in the same manner as above were dipped in water for 3 days and then, adhesive strength of the specimens was measured. As a result, adhesive strength was 18.1 kg/2 cm. The results are shown in Table 1.

EXAMPLES 2–4

Comparative Examples 1–3

Example 1 was repeated except that conditions as shown in Table 1 were employed. The epoxy treating solution used in Example4 was prepared by mixing 3,4'-diaminodiphenyl ether dissolved in a small amount of N,N-dimethylformamide with an emulsion prepared by dispersing tetraglycidyldiaminodiphenylmethane in water. The results are shown in Table 1.

As shown in Table 1, high values were obtained in both the initial adhesive strength and the adhesive strength after dipping in water in Examples.

On the other hand, both the initial adhesive strength and the adhesive strength after dipping in water were inferior in Comparative Example 1 where amounts of epoxy compounds and aromatic amines were smaller than the ranges of the present invention.

The adhesion after dipping in water was inferior in Comparative Example 2 where conventional epoxy compounds and curing agents which were not of the present invention were used.

Furthermore, both the initial adhesive strength and the adhesive strength after dipping in water were inferior in Comparative Example 3 where aromatic amine of the present invention was used as a curing agent, out a compound which was not of the present invention was used as epoxy compound.

TABLE 1

| | Examples | | | |
|---|---|---|---|---|
| | 1 | 2 | 3 | 4 |
| The first step | | | | |
| (Epoxy treating solution) | | | | |
| Epoxy compounds*1 | A | A | A | A' |
| Concentration (wt %) | 2 | 5 | 8 | 4 |
| Aromatic amines*2 | D | D | D | D |
| Parts by weight*3 | 3 | 10 | 20 | 3 |
| The second step | (Same as in Example 1) | | | |
| (Treating solution in the second step) | | | | |
| Evaluation | | | | |
| Initial adhesive strength (kg/2cm) | 18.5 | 15.1 | 13.5 | 25.7 |
| Adhesive strength after dipping in water (kg/2cm) | 18.1 | 10.4 | 10.2 | 23.9 |

| | Comparative Examples | | |
|---|---|---|---|
| | 1 | 2 | 3 |
| The first step | | | |
| (Epoxy treating solution) | | | |
| Epoxy compounds*1 | A | B | C |
| Concentration (wt %) | 0.01 | 2 | 2 |
| Aromatic amines*2 | D | E | D |
| Parts by weight*3 | 0.5 | 2.2 | 1.9 |
| The second step | (Same as in Example 1) | | |
| (Treating solution in the second step) | | | |
| Evaluation | | | |
| Initial adhesive strength (kg/2cm) | 4.1 | 14.5 | 7.6 |
| Adhesive strength after | 2.7 | 6.0 | 4.2 |

TABLE 1-continued dipping in water (kg/2cm)

*[1]A: Tetraglycidyldiaminodiphenylmethane
B: Glycerin polyglycidyl ether
C: Bisphenol A diglycidyl ether
A': Emulsion prepared by dispersing A in water
*[2]D: 3,4'-diaminodiphenyl ether
E: Piperazine
*[3]Part by weight based on 100 parts by weight of the epoxy compounds

EXAMPLE 5

Double twist cords (first twist: 330 turn/m (Z), second twist: 330 turn/m (S)) of poly-p-phenyleneterephthalamide fibers ("TWARON" 1000 manufactured by Akzo Co., 1500 d) were continuously dipped in the following epoxy treating solution under a tension of 500 g by a cord dip treating machine and then were dried and cured by passing them in ovens of 150° C. and 240° C. for 2 minutes, respectively. The epoxy treating solution used here comprised 2.0 parts by weight of tetraglycidyldiaminodiphenylmethane ("SUMIEPOXY" ELM-434 manufactured by Sumitomo Chemical Co., Ltd.) as epoxy compounds, 0.060 part by weight of 3,4'-diaminodiphenyl ether as aromatic amines and 98.0 parts by weight of N,N-dimethylformamide as solvents.

Then, the aromatic polyamide fibers subjected to the treatment of the first step were dipped in the following treating solution for the second step and dried and cured by passing them in ovens of 150° C. and 240° C. for 2 minutes, respectively.

The treating solution for the second step used here was prepared by allowing 5.0 g of resorcin to react with 2.8 g of formaldehyde (37 weight % aqueous solution) in 62.9 g of pure water at room temperature for 2 hours to prepare RF (resorcin-formaldehyde) resin solution, adding the resin solution to a rubber latex solution comprising 62.0 g of vinylpyridine-styrene-butadiene rubber latex ("PYRATEX" manufactured by Sumitomo Naugatuck Co., Ltd., 41 weight % aqueous solution) and 18.2 g of pure water to prepare RFL solution, and mixing the RFL solution with 100 g of 2,6-bis(2',4'-dihydroxyphenylmethyl)-4-chlorophenol (hereinafter referred to as "chlorophenol compound") ("DENABOND" by Nagase Chemicals Co., 20 weight % aqueous solution). Solid content ratio of the chlorophenol compound to RFL was 64/100 and concentration of total solid matters was 20% by weight.

The thus treated aromatic polyamide fibers were subjected to the same adhesion test as used in Example 1. As a result, adhesive strength was 28.0 kg/2 cm. Furthermore, specimens prepared in the same manner were dipped in water for 7 days and then, adhesive strength of these specimens was measured. As a result, an adhesive strength was 24.5 kg/2 cm.

EXAMPLE 6

The first step was carried out in the same manner as in Example 5 except that amount of 3,4'-diaminodiphenyl ether was as shown in Table 2. The second step was carried out in the same manner as in Example 5 except that treating solution containing RFL solution and chlorophenol compound was prepared by allowing 1.7 g of resorcin to react with 1.3 g of formaldehyde (37 weight % aqueous solution) in an aqueous solution comprising 2.7 g of 5 weight % aqueous sodium hydroxide solution and 63.7 g of pure water at room temperature for 2 hours to prepare RF resin solution, adding the solution to 26.8 g of vinylpyridine-styrene-butadiene rubber latex ("PYRATEX" manufactured by Sumitomo Naugatuck Co., Ltd., 41 weight % aqueous solution) to prepare RFL solution, and mixing 66.0 g of a chlorophenol compound ("DENABOND" manufactured by Nagase Chemicals Co., 20 weight % aqueous solution) and 101.8 g of pure water. The solution had 100/100 of a solid content ratio of the chlorophenol compound to RFL and 10% by weight of concentration of total solid matters. The results are shown in Table 2.

EXAMPLES 7 AND 8

Comparative Examples 4 and 5

Example 5 was repeated except that conditions as shown in Table 2 were employed. The epoxy treating solution used in Example 7 was prepared by mixing 3,4'-diaminodiphenyl ether dissolved in a small amount of N,N-dimethylformamide with an emulsion prepared by dispersing tetraglycidyldiaminophenylmethane in water. The results are shown in Table 2.

As shown in Table 2, high values were obtained in both the initial adhesive strength and the adhesive strength after dipping in water in all of the Examples according to the present invention.

On the other hand, both the initial adhesive strength and the adhesive strength after dipping in water were inferior in Comparative Example 4 where amounts of epoxy compound and aromatic amine were smaller than the ranges of the present invention. The adhesive strength after dipping in water was inferior in Comparative Example 5 where conventional epoxy compound and curing agent which were not the present invention were used.

TABLE 2

| | Examples | | | |
|---|---|---|---|---|
| | 5 | 6 | 7 | 8 |
| The first step | | | | |
| (Epoxy treating solution) | | | | |
| Epoxy compounds*[1] | A | A | A' | A |
| Concentration (wt %) | 2 | 2 | 4 | 2 |
| Aromatic amines*[2] | D | D | D | D |
| Parts by weight*[3] | 3 | 10 | 20 | 3 |
| The second step | | | | |
| ① RF resins (wt %) | 2.4 | 0.83 | 0.9 | 4.0 |
| ② Rubber latices (wt %) | 10.2 | 4.2 | 3.8 | 16.9 |
| ①/② Solid content ratio*[4] | 24 | 20 | 24 | 24 |
| ③ Chlorophenol compounds (wt %) | 8.0 | 5.0 | 3.0 | 0 |
| ③/(①+②) solid content ratio*[5] | 64 | 100 | 64 | 0 |
| Total solid content (wt %) | 20 | 10 | 7.5 | 21 |
| Evaluation | | | | |
| Initial adhesive strength (kg/2cm) | 28.0 | 26.0 | 22.4 | 17.9 |
| Adhesive strength after dipping in water (kg/2cm) | 24.5 | 23.6 | 18.2 | 15.0 |

| | Comparative Examples | |
|---|---|---|
| | 4 | 5 |
| The first step | | |
| (Epoxy treating solution) | | |
| Epoxy compounds*[1] | A | B |
| Concentration (wt %) | 0.01 | 2 |
| Aromatic amines*[2] | D | E |
| Parts by weight*[3] | 0.5 | 2.2 |
| The second step | | |
| ① RF resins (wt %) | 2.4 | 2.4 |
| ② Rubber latices (wt %) | 10.2 | 10.2 |
| ①/② solid content ratio*[4] | 24 | 24 |
| ③ Chlorophenol compounds (wt %) | 8.0 | 8.0 |
| ③/(①+②) solid content ratio*[5] | 64 | 64 |
| Total solid content (wt %) | 20 | 20 |

TABLE 2-continued

| Evaluation | | |
|---|---|---|
| Initial adhesive strength (kg/2cm) | 6.5 | 16.0 |
| Adhesive strength after dipping in water (kg/2cm) | 3.4 | 9.8 |

*[1] A: Tetraglycidyldiaminodiphenylethane
B: Glycerinpolyglycidyl ether
A': Emulsion prepared by dispersing A in water
*[2] D: 3,4'-Diaminodiphenyl ether
E: Piperazine
*[3] Part by weight based on 100 parts by weight of the epoxy compound
*[4] Ratio of ① in part by weight when amount of ② is 100 parts by weight.
*[5] Ratio of ③ in part by weight when amount of ① + ② (RFL) is 100 parts by weight.

INDUSTRIAL APPLICABILITY

As explained above, the present invention is able to provide a method for producing aromatic polyamide fibers for reinforcement of rubbers which not only have high adhesive strength in initial adhesion, Out also small decrease in adhesive strength even after being dipped in water for a long time and are excellent in water resistance.

Rubbers reinforced with the aromatic polyamide fibers obtained by the method of the present invention are utilized in a wide variety of industrial fields such as tires, belts, hoses and others.

We claim:

1. A process for producing aromatic polyamide fibers for reinforcement of rubber comprising:
   (a) dipping aromatic polyamide fiber in an epoxy treating dispersion and then drying and curing the dipped aromatic polyamide fiber, said epoxy treating dispersion having 0.1–30% by weight of at least one aromatic epoxy compound having two or more epoxy groups in one molecule, and 1–100 parts by weight of at least one aromatic amine, based on 100 parts by weight of the aromatic epoxy compounds, in water, wherein said epoxy treating dispersion is stabilized with a stabilizing amount of a surfactant, an organic solvent or both; and
   (b) dipping the aromatic polyamide fiber from (a) in a treating solution containing resorcin-formaldehyde resins and rubber latices and then drying and curing the second treated aromatic polyamide fiber.

2. A process for producing aromatic polyamide fibers for reinforcement of rubber according to claim 1, wherein the treating solution in (b) comprises resorcin-formaldehyde resins, rubber lactices and compounds represented by the following formula (1):

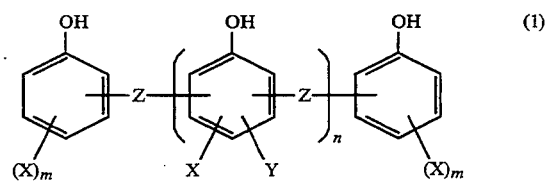

wherein X each represents a hydrogen atom, a chlorine atom, a bromine atom, an alkyl group of 1–8 carbon atoms, an aryl group or an aralkyl group, —OH, —SH, —NH2, —NO2, —COOH, —CH2OH or

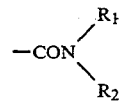

Y represents a hydrogen atom, —OH, a chlorine atom or a bromine atom,
Z represents

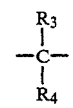

m represents an integer of 0–2 and n represents an integer of 1–10, and wherein $R_1$ and $R_2$ each represents a hydrogen atom, an alkyl group of 1–8 carbon atoms, an aryl group or an aralkyl group and $R_3$ and $R_4$ each represents a hydrogen atom or an alkyl group of 1–8 carbon atoms.

3. A process for producing aromatic polyamide fibers for reinforcement of rubber according to claim 1, wherein the epoxy treating dispersion contains 0.3–20% by weight of at least one aromatic epoxy compound having two or more epoxy groups in one molecule and 1.2–40 parts by weight of at least one aromatic amine based on 100 parts by weight of the aromatic epoxy compound.

4. A process for producing aromatic polyamide fibers for reinforcement of rubber according to claim 1, wherein the epoxy treating dispersion contains 0.5–8% by weight of at least one aromatic epoxy compound having two or more epoxy groups in one molecule and 1.5–30 parts by weight of at least one aromatic amine based on 100 parts by weight of the aromatic epoxy compound.

5. A process for producing aromatic polyamide fibers for reinforcement of rubber according to claim 1 or 2, wherein the aromatic epoxy compound is at least one member selected from the group consisting of tetraglycidyldiaminodiphenylmethane, triglycidyl-p-aminophenol, triglycidyl-m-aminophenol, triglycidyl-4-amino-m-cresol, diglycidylaniline, diglycidyltoluidine, tetraglycidyl-m-xylylenediamine and diglycidyltribromoaniline.

6. A process for producing aromatic polyamide fibers for reinforcement of rubber according to claim 1 or 2, wherein the aromatic epoxy compound is tetraglycidyldiaminodiphenylmethane.

7. A process for producing aromatic polyamide fibers for reinforcement of rubber according to claim 1 or 2, wherein the aromatic epoxy compounds are emulsions which are obtained by dispersing tetraglycidyldiaminophenylmethane in water.

8. A process for producing aromatic polyamide fibers for reinforcement of rubber according to claim 1 or 2, wherein the aromatic amine is at least one member selected from the group consisting of 3,4'-diaminodiphenyl ether, 4,4'-diaminodiphenyl sulfone, p,p'-diaminodinodiphenylmethane, m-phenylenediamine, m-toluylenediamine, o-toluylenediamine, xylylenediamine, 4-chloro-o-phenylenediamine, 3'-diethyl-4,4'-diamino-diphenylmethane, m-aminobenzylamine, diaminopyridine and m-aminophenol.

9. A process for producing aromatic polyamide fibers for reinforcement of rubber according to claim 1 or 2, wherein the aromatic amine is 3,4'-diaminodiphenyl ether.

10. A process for producing aromatic polyamide fibers for reinforcement of rubber according to claim 1, wherein the drying in (a) comprises heat treating at about 120°–180° C. for 1–10 minutes, and the curing in (a) comprises heat treating at about 180°–260° C. for 0.5–20 minutes.

11. A process for producing aromatic polyamide fibers for reinforcement of rubber according to claim 2, wherein the compound represented by the formula (1) is at least one member selected from the group consisting of 2,6-bis(2',4'-dihydroxyphenylmethyl)-4-chlorophenol, 2,6'-bis(2'.4'-dihydroxyphenylmethyl)-4-bromophenol and 2,6-bis(2',4'-dichlorophenylmethyl)-4-chlorophenol.

12. A process for producing aromatic polyamide fibers for reinforcement of rubber according to claim 2, wherein the compound represented by the formula (1) is 2,6-bis(2',4'-dihydroxyphenylmethyl)-4-chlorophenol.

13. A process for producing aromatic polyamide fibers for reinforcement of rubber according to claim 2, wherein the compound represented by the forumula (1) comprises an amount within the range of 10–200 parts by weight for every 100 parts by weight of solid in the resorcin-formaldehyde resins and rubber latices.

14. A process for producing aromatic polyamide fibers for reinforcement of rubber comprising:

(a) dipping aromatic polyamide fiber in an aqueous dispersion which consists essentially of 0.1–30% by weight of at least one aromatic epoxy compound selected from the group consisting of tetraglycidyl-diaminodiphenylmethane, triglycidyl-p-aminophenol, triglycidyl-m-aminophenol, triglycidyl-4-amino-m-cresol, diglycidylaniline, diglycidyltoluidine, tetraglycidyl-m-xylylenediamine and diglycidyltribromoaniline, and 1–100 parts by weight of at least one aromatic amine, based on 100 parts by weight of the aromatic epoxy compound, selected from the group consisting of 3,4'-diaminodiphenyl ether, 4,4'-diaminodiphenyl sulfone, p,p'-diaminodinodiphenylmethane, m-phenylenediamine, m-toluylenediamine, o-toluylenediamine, xylylenediamine, 4-chloro-o-phenylenediamine, 3,'-diethyl-4,4'-diaminodiphenylmethane, m-aminobenzylamine, diaminopyridine and m-aminophenol, in water, wherein said aqueous dispersion is stabilized with a stabilizing effective amount of a surfactant, an organic solvent, or both, and drying and curing the dipped aromatic polyamide fiber; and (b) dipping the aromatic polyamide fiber from (a) in a treating solution which consists essentially of resorcin-formaldehyde resins, rubber latices and compounds represented by the following formula (1):

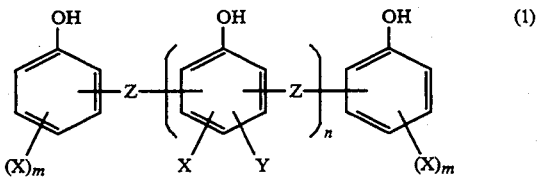

wherein X each represents a hydrogen atom, a chlorine atom, a bromine atom, an alkyl group of 1–8 carbon atoms, an aryl group or an aralkyl group, —OH, —SH, —NH2, —NO2, —COOH, —CH2OH or

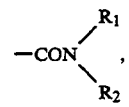

Y represents a hydrogen atom, —OH, a chlorine atom or a bromine atom,

Z represents

m represents an integer of 0–2,
n represents an integer of 1–10,
$R_1$ and $R_2$ each represents a hydrogen atom, an alkyl group of 1–8 carbon atoms, an aryl group or an aralkyl group, and
$R_3$ and $R_4$ each represents a hydrogen atom or an alkyl group of 1–8 carbon atoms, and drying and curing the treated aromatic polyamide fiber.

* * * * *